US008672351B2

(12) United States Patent
Stevens

(10) Patent No.: US 8,672,351 B2
(45) Date of Patent: Mar. 18, 2014

(54) SIDE CURTAIN AIR BAG DESIGN

(75) Inventor: Bruce A. Stevens, Oakland, MI (US)

(73) Assignee: Automotive Systems Laboratory, Inc., Armada, MI (US)

( * ) Notice: Subject to any disclaimer, the term of this patent is extended or adjusted under 35 U.S.C. 154(b) by 1214 days.

(21) Appl. No.: 11/009,310

(22) Filed: Dec. 10, 2004

(65) Prior Publication Data

US 2005/0161917 A1    Jul. 28, 2005

Related U.S. Application Data

(60) Provisional application No. 60/528,665, filed on Dec. 11, 2003.

(51) Int. Cl.
*B60R 21/232* (2011.01)
*B60R 21/233* (2006.01)

(52) U.S. Cl.
USPC ............... 280/743.1; 280/729; 280/730.2

(58) Field of Classification Search
USPC ............ 280/730.2, 730.1, 729, 743.1
See application file for complete search history.

(56) References Cited

U.S. PATENT DOCUMENTS

| 5,421,610 | A | | 6/1995 | Kavanaugh et al. | ........ | 280/743.1 |
| 5,562,302 | A | * | 10/1996 | Turnbull | .................. | 280/730.1 |
| 5,566,977 | A | | 10/1996 | Wipasuramonton | ....... | 280/743.1 |
| 5,586,782 | A | * | 12/1996 | Zimmerman et al. | ..... | 280/730.2 |
| 5,975,564 | A | | 11/1999 | Smith et al. | | |
| 6,129,377 | A | * | 10/2000 | Okumura et al. | .......... | 280/730.2 |
| 6,220,625 | B1 | * | 4/2001 | Wallner et al. | ............. | 280/730.2 |
| 6,355,123 | B1 | * | 3/2002 | Baker et al. | ..................... | 156/90 |

(Continued)

FOREIGN PATENT DOCUMENTS

JP    01064835 A    3/1989

OTHER PUBLICATIONS

Office Action for U.S. Appl. No. 11/007,841, filed Dec. 9, 2004 mailed Jun. 14, 2006.

(Continued)

*Primary Examiner* — Paul N Dickson
*Assistant Examiner* — George Spisich
(74) *Attorney, Agent, or Firm* — L.C. Begin & Associates, PLLC.

(57) ABSTRACT

A side curtain airbag (110, 210, 310, 410, 510) for use with a linear gas generator or inflator. In one embodiment, the airbag (110, 210, 310, 410) includes a first longitudinal panel (113, 213, 313, 413), a second longitudinal panel (114, 214, 314, 414) adjacent the first panel, and a plurality of seams (116, 220, 320, 420) connecting the adjacent panels to define a plurality of inflation fluid flow passages (117, 217, 317, 417) between the seams. The seams extend along a substantial portion of a lateral extent of the airbag. The seams are also distributed along substantially an entire length of the airbag. In another embodiment, the airbag includes a first panel (513), a second panel (514) adjacent the first panel, and a plurality of substantially straight seams (520) connecting the adjacent panels to define a plurality of inflation fluid flow passages (517) between the seams (520). Use of the seam patterns described herein in side airbag systems allows for improved airbag performance, particularly when used in conjunction with a linear inflator. Inflation of the airbag takes place in a more uniform manner, reducing the risk of localized overpressurization and seam bursting, and improving occupant protection. Moreover, the seam patterns disclosed herein are relatively simple, and their manufacture is relatively easy ands inexpensive.

12 Claims, 2 Drawing Sheets

(56) References Cited

U.S. PATENT DOCUMENTS

| | | | |
|---|---|---|---|
| 6,431,587 B1 * | 8/2002 | O'Docherty | 280/730.2 |
| 6,520,534 B2 * | 2/2003 | Ritter | 280/730.2 |
| 6,575,496 B2 * | 6/2003 | Hess et al. | 280/730.2 |
| 6,585,293 B2 * | 7/2003 | Keshavaraj | 280/743.1 |
| 6,612,612 B2 | 9/2003 | Zerbe | 280/730.2 |
| 6,648,367 B2 | 11/2003 | Breed et al. | 280/730.1 |
| 2002/0140218 A1 * | 10/2002 | Beasley, Jr. | 280/743.1 |
| 2002/0155774 A1 | 10/2002 | Kitamura et al. | |
| 2002/0175503 A1 * | 11/2002 | Hess et al. | 280/730.2 |
| 2003/0052477 A1 * | 3/2003 | Challa et al. | 280/730.2 |
| 2005/0104343 A1 * | 5/2005 | Levine | 280/730.2 |
| 2005/0121888 A1 * | 6/2005 | Sato et al. | 280/730.2 |

OTHER PUBLICATIONS

Office Action for U.S. Appl. No. 11/007,841, filed Dec. 12, 2006 mailed Dec. 12, 2006.

PCT International Preliminary Report on Patentability Feb. 1, 2010.

* cited by examiner

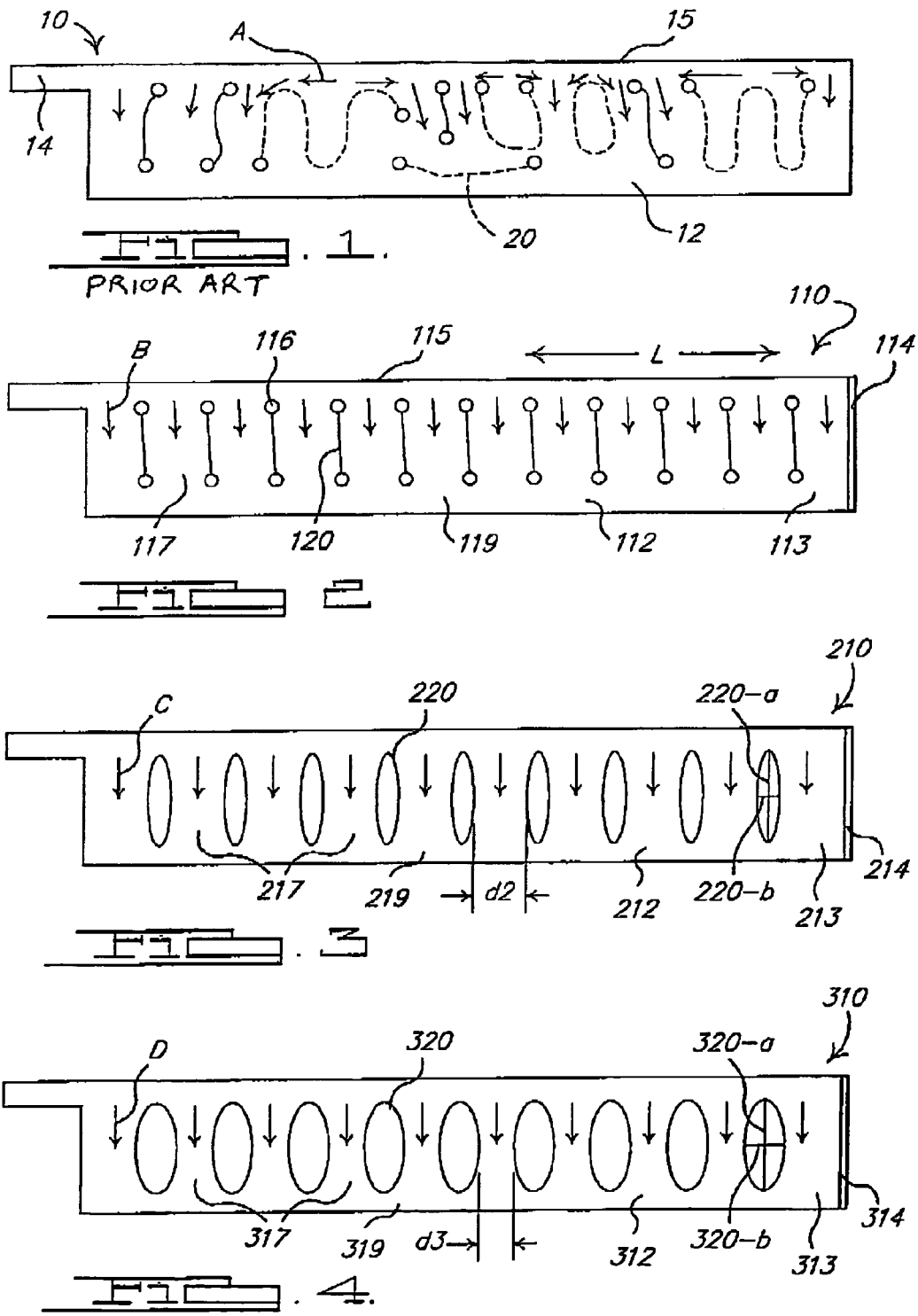

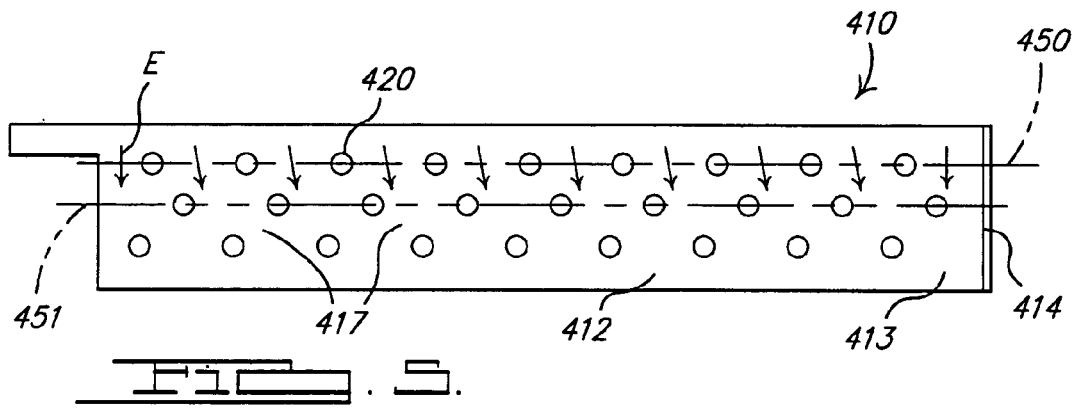
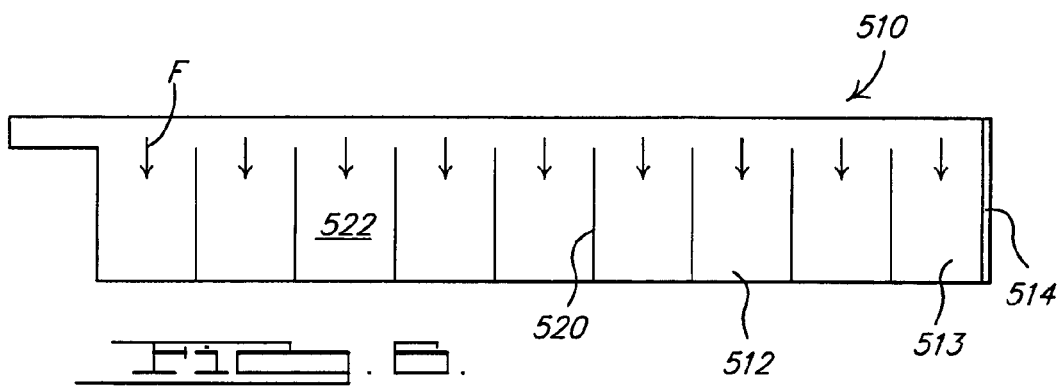
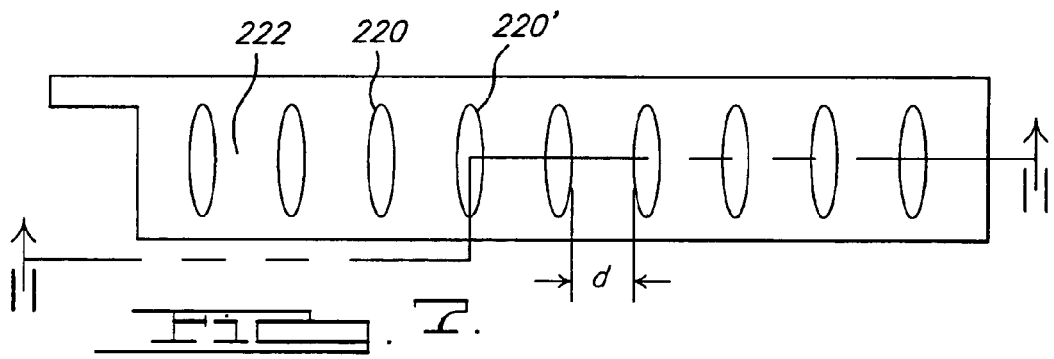
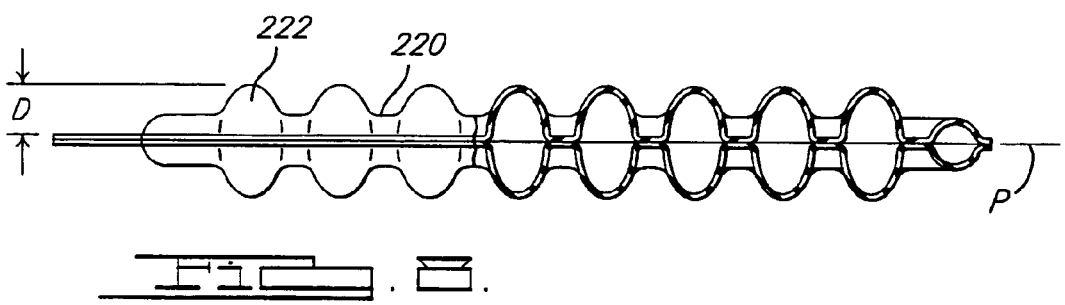

SIDE CURTAIN AIR BAG DESIGN

CROSS-REFERENCE TO RELATED APPLICATION

This application is entitled to and claims the benefit of Provisional Patent Application Ser. No. 60/528,665, filed on Dec. 11, 2003.

BACKGROUND OF THE INVENTION

The invention relates to inflatable motor vehicle airbags. More particularly, the invention relates to airbags that protect a vehicle passenger from side impact collisions.

Side impact airbags are utilized in motor vehicles for protecting occupants from injury due to impact with an interior side of a vehicle. A side impact airbag may be designed for use with a linear inflator, which is known in the art and differs from conventional inflators primarily in that inflation gas is discharged substantially uniformly along a length of the inflator. Conventional inflators, in contrast, typically include a single gas nozzle outlet, and are used in conjunction with a distribution pipe extending along an airbag. Referring to FIG. 1, there is illustrated an inflatable airbag 10 in accordance with a known design. Airbag 10 includes a plurality of seams 20 connecting adjacent panels or sides of an airbag body 12. Arrows "A" indicate approximate directions of the flow of inflation gas inside the airbag body 12, delivered via a linear inflator (not shown) extending along a top edge 15 of airbag body 12. Seams 20 restrict the predominant flow of gas to certain paths. Linear inflators, because they distribute gas uniformly along their length, can create localized overpressurization and seam failure when used with typical airbags incorporating seam patterns such as those shown in FIG. 1.

SUMMARY OF THE INVENTION

The present invention broadly provides a side curtain airbag having minimal obstruction to the flow of inflation gas, particularly for use with a linear gas generator or inflator. In one embodiment, the airbag includes a first longitudinal panel, a second longitudinal panel adjacent the first panel, and a plurality of elliptically-shaped seams connecting the adjacent panels to define a plurality of inflation fluid flow passages between the seams. The seams extend along a substantial portion of a lateral extent of the airbag. The seams are also distributed along substantially an entire length of the airbag. In another embodiment, the airbag includes a first panel, a second panel adjacent the first panel, and a plurality of substantially straight seams connecting the adjacent panels to define a plurality of inflation fluid flow passages between the seams. Use of the seam patterns described herein in side airbag systems allows for improved air bag performance, particularly when used in conjunction with a linear inflator. Inflation of the airbag takes place in a more uniform manner, reducing the risk of localized overpressurization and seam bursting, and improving occupant protection. Moreover, the seam patterns disclosed herein are relatively simple, and their manufacture is relatively easy and inexpensive.

BRIEF DESCRIPTION OF THE DRAWINGS

In the drawings illustrating embodiments of the present invention:

FIG. 1 is a side view of a prior art side airbag showing seam patterns incorporated therein;

FIG. 2 is a side view of an airbag in accordance with a first embodiment of the present invention;

FIG. 3 is a side view of an airbag in accordance with a second embodiment of the present invention;

FIG. 4 is a side view of an airbag in accordance with a third embodiment of the present invention, and further provides a schematic representation of a vehicle occupant protection system, in accordance with the present invention.

FIG. 5 is a side view of an airbag in accordance with a fourth embodiment of the present invention;

FIG. 6 is a side view of an airbag in accordance with a fifth embodiment of the present invention;

FIG. 7 is the side view of FIG. 3;

FIG. 8 is an edge view of the airbag embodiment shown in FIG. 7 shown in an inflated state; and

DETAILED DESCRIPTION

FIGS. 2-6 show various embodiments of side curtain airbags in accordance with the present invention. Prior to deployment, the side airbag is rolled or folded in a space along a roof rail (not shown) of a vehicle and is concealed by the interior headliner material (not shown) of the vehicle. Upon airbag activation, the inflation gas produces sufficient pressure to cause the airbag to break through the headliner material and deploy. The length of the airbag such that it extends along the side of the vehicle interior proximate a driver or a front seat passenger and thus offers protection for either the driver or the passenger. The features described herein are particularly applicable to (but are not restricted to) side impact air bags.

Referring to FIG. 2, in a system utilizing a linear inflator (not shown) in conjunction with airbag 110, the linear inflator is preferably positioned longitudinally along a top edge 115 of airbag body 112. Thus, inflation gas from the inflator is discharged substantially uniformly along the length of the inflator and directed substantially uniformly into airbag body 112. One suitable linear inflator is described in U.S. Pat. No. 5,094,475 to Olsson et al., hereby incorporated by reference. Arrows "B" in FIG. 2 illustrate a predominant flow direction of inflation gases within the airbag body 112.

Referring again to FIG. 2, there is shown a first embodiment of the present invention comprising an airbag 110 having an airbag body 112 formed from a first longitudinal panel 113, a second longitudinal panel 114 adjacent first panel 113, and a plurality of elliptically-shaped seams 116 connecting panels 113 and 114 to define a plurality of inflation fluid flow passages 117 between the seams. Seams 116 are aligned in a pair of longitudinal rows and are substantially evenly spaced along each row. Pairs of elliptically-shaped seams 116 are connected by substantially straight laterally-extending seams 120 oriented generally perpendicular to top edge 115 of airbag body 112, and thus substantially parallel to direction "B" of the predominant flow of inflation gas.

In the embodiment shown in FIG. 2, straight seams 120 are of substantially equal lengths to provide corresponding flow passages 117 having substantially equal lengths. In addition, seams 120 are preferably substantially evenly spaced along a length "L" of airbag body 112 to provide flow passages 117 having substantially equal cross-sectional areas. Furthermore, it may also be seen that inflation fluid flow passages 117 formed by seams 116 and 120 are in fluid communication with each other and with a flow passage 119 extending substantially perpendicular to fluid flow passages 117. These features help to prevent overpressurization in localized regions of the airbag interior and ensure substantially uniform inflation of airbag 110. It may also be seen from the drawings that seams 120 extend along a substantial portion of a lateral extent of the airbag, and that the seams are also distributed along substantially an entire length of the airbag.

In a particular embodiment of the present invention, shown in FIG. 2, one or more of elliptically-shaped seams 116 has a substantially circular shape (i.e., the shape of the seam has an eccentricity of approximately zero.) It is recognized for purposes of the present invention that a circle is a type of ellipse which has an eccentricity of zero.

Refining now to FIG. 3, there is shown an airbag 210 according to a second embodiment of the present invention. Airbag 210 is similar in structure to airbag 110 and has an airbag body 212 formed from a first panel 213 and a second panel 214 adjacent first panel 213. However, rather than a plurality of elliptically-shaped seams connected by substantially linear seams, panels 213 and 214 of airbag 210 are connected only by a plurality of relatively larger laterally-extending substantially elliptically-shaped seams 220 to define a plurality of inflation fluid flow passages 217 between the seams. Seams 220 are preferably oriented such that the major axes of the ellipses defined thereby are laterally-extending and substantially parallel. Thus, inflation gas flowing into airbag body 212, indicated by arrows "C", passes substantially uniformly between the sewn or otherwise attached elliptically-shaped seams 220.

In the embodiment shown in FIG. 3, elliptically-shaped seams 220 have major axes 220-a of substantially equal lengths to provide corresponding flow passages 217 having substantially equal lengths. In addition, the minimum separation distances d2 between adjacent seams 220 are preferably substantially equal along a length "L" of airbag body 212, thereby providing flow passages 217 having substantially equal cross-sectional areas. It may also be seen from the drawings that seams 220 extend along a substantial portion of a lateral extent of the airbag, and that the seams are distributed along substantially an entire length of the airbag. Furthermore, it may also be seen that inflation fluid flow passages 217 formed by seams 220 are in fluid communication with each other and with a flow passage 219 extending substantially perpendicular to fluid flow passages 217.

Referring now to FIG. 4, there is shown an airbag 310 according to a third embodiment of the present invention. Airbag 310 is similar to airbag 210, illustrated in FIG. 3, and has an airbag body 212 formed from a first panel 313, a second panel 314 adjacent first panel 313, and a plurality of elliptically-shaped seams 320 connecting panels 313 and 314 to define a plurality of inflation fluid flow passages 317 between the seams. However, the elliptically-shaped seams shown in FIG. 4 have relatively larger minor axes than the seams shown in FIG. 3 (i.e., the elliptically-shaped seams of FIG. 4 have smaller eccentricities than the elliptically-shaped seams of FIG. 3.) Similar to airbag 210, inflation gas flows between the elliptically-shaped seams 320, in a direction substantially parallel with the major axes of the elliptically-shaped seams.

In the embodiment shown in FIG. 4, seams 320 have major axes 320-a of substantially equal lengths to provide corresponding flow passages 317 having substantially equal lengths. In addition, the minimum separation distances d3 between adjacent seams 320 are preferably substantially equal along a length "L" of airbag body 312, thereby providing flow passages 317 having substantially equal cross-sectional areas. Furthermore, it may also be seen that inflation fluid flow passages 317 formed between seams 320 are in fluid communication with each other and with a flow passage 319 extending substantially parallel with the minor axes 320-b of elliptically-shaped seams.

FIG. 5 illustrates yet another airbag 410, according to fourth embodiment of the present invention. Airbag has an airbag body 412 formed from a first panel 413, a second panel 414 adjacent first panel 413, and a plurality of elliptically-shaped seams 420 connecting panels 413 and 414 to define a plurality of inflation fluid flow passages 417 between the seams. In this embodiment, seams 420 are substantially circular and are arranged in one or more substantially parallel rows 450 and 451. Seams 420 may also be substantially evenly spaced apart along a row. In addition, as seen in FIG. 5, seams arranged along a first row 450 of the substantially parallel rows form a zigzag pattern with seams arranged along a second row 451 of the substantially parallel rows. The predominant direction of inflation gas flow is illustrated in FIG. 5 with arrows "E". In alternative embodiments (not shown), the arrangement of the substantially circular seams 420 may be non-linear, otherwise structured, or random.

FIG. 6 illustrates an airbag 510 according to a fifth embodiment of the present invention. Airbag 510 includes an airbag body 412 formed from a longitudinal first panel 513, a longitudinal second panel 514 adjacent first panel 513, and a plurality of substantially straight seams 520, defining a plurality of fluidly connected inflatable regions 522. Seams 520 are substantially parallel and are spaced apart substantially evenly. Seams extend substantially parallel to a direction F in which an inflation gas exits an inflator. Substantially straight seams 520 assist in channeling the gas flow from a linear inflator (not shown) in a direction substantially parallel to an orientation of the seams, similar to the foregoing embodiments.

Referring to FIGS. 7 and 8, using any of the airbag embodiments described above, the dimensions and the spacing of elliptically-shaped seams may be adapted to control the distance traveled by the head of a passenger prior to being stopped by the airbag. FIG. 7 shows the airbag embodiment shown in FIG. 3, and FIG. 8 shows an edge view of the embodiment in FIG. 7 in an inflated state. As seen in FIGS. 7 and 8, a pair of adjacent seams 220 and 220' extends along a plane P defined along the intersection of airbag panels 213 and 214. It may also be seen that the minimum separation distance d between the pair of adjacent seams may be adjusted such that a portion 222 of the airbag projects at least a predetermined distance D out of plane P when the airbag is inflated. The distance D can be specified so as to limit the travel of a passenger's head prior to impacting the airbag (i.e., for a relatively greater projection distance D, the passenger's head will travel a relatively shorter distance prior to impacting the airbag.)

Any of the airbag embodiments described above may also be incorporated into an airbag system 200 (not shown). Airbag system 200 includes at least one airbag 110, 210, 310, 410, 510 in accordance with an embodiment of the present invention, and a linear inflator 100 coupled to the airbag so as to enable fluid communication with an interior of the airbag. Inflator 100 is configured to discharge inflation gas substantially uniformly along a length of the airbag. As described above, airbag embodiments 110, 210, 310, 410 include a first panel, a second panel adjacent the first panel, and a plurality of elliptically-shaped seams connecting the panels to define a plurality of inflation fluid flow passages between the seams. Also as described above, airbag embodiment 510 includes an airbag body 412 formed from a first panel, a second panel adjacent first panel, and a plurality of substantially straight seams defining a plurality of fluidly connected inflatable regions. Airbag system 200 may also include (or may be in communication with) a crash event sensor 210 including a known crash sensor algorithm that signals actuation of airbag system 200 via, for example, activation of airbag inflator 100 in the event of a collision. At least a portion of the airbag 110, 210, 310, 410, 510 is configured to cover a side wall of a vehicle when the airbag is inflated.

Airbag system 200 may also be incorporated into a broader, more comprehensive vehicle occupant restraint system 180 including additional elements such as a safety belt assembly 150 (not shown). FIG. 4 shows a schematic diagram of one exemplary embodiment of such a restraint system 180.

Safety belt assembly 150 includes a safety belt housing 152 and a safety belt 101 extending from housing 152. A safety belt retractor mechanism 154 (for example, a spring-loaded mechanism) may be coupled to an end portion 153 of the belt. In addition, a safety belt pretensioner 156 may be coupled to belt retractor mechanism 154 to actuate the retractor mechanism in the event of a collision. Typical seat belt retractor mechanisms which may be used in conjunction with the safety belt embodiments of the present invention are described in U.S. Pat. Nos. 5,743,480, 5,553,803, 5,667,161, 5,451,008, 4,558,832 and 4,597,546, incorporated herein by reference. Illustrative examples of typical pretensioners with which the safety belt embodiments of the present invention may be combined are described in U.S. Pat. Nos. 6,505,790 and 6,419,177, incorporated herein by reference.

Safety belt system 150 may also include (or may be in communication with) a crash event sensor 158 (for example, an inertia sensor or an accelerometer) including a known crash sensor algorithm that signals actuation of belt pretensioner 156 via, for example, activation of a pyrotechnic igniter (not shown) incorporated into the pretensioner. U.S. Pat. Nos. 6,505,790 and 6,419,177, previously incorporated herein by reference, provide illustrative examples of pretensioners actuated in such a manner.

The airbag embodiments described herein are preferably formed from known materials and by known processes. Exemplary suitable airbag materials and manufacturing methods are set forth in U.S. Pat. Nos. 6,632,753, 6,458,725 and 5,044,663 and U.S. patent application Publication Nos. 2003/0148683, 2003/0129339, 2003/0104226, 2003/0060103 and 20020155774. Each listed reference is hereby incorporated by reference in its entirety. For example, the airbag may be formed from a single panel of material folded over, joined, and sealed along mating edges to form an enclosure. Alternatively, the airbag may be formed from two or more separate panels of material joined and sealed along edges thereof. An inlet may be provided for insertion of a portion of a linear inflator into the airbag, to extend along a lengthwise edge of the airbag (for example, edge 115 of FIG. 2). Alternatively, the airbag may be formed to enclose the inflator in the interior of the airbag, with a medium for transmission of an airbag actuation signal extending from an exterior of the airbag, through one or more of the constituent panels, and into the interior of the airbag to operatively communicate with, for example, an electrical circuit provided in the airbag inflator. The respective seams may be formed by any suitable known process. For example, in some instances it may be desirable to manually or mechanically sew stitches along the length of the seams. Alternative embodiments, for example utilizing a non-fabric or polymer coated fabric to form the airbag body, could employ heat sealing or ultrasonic welding to adhere the panels or sides of the airbag, thereby forming the seams. Still further contemplated embodiments use an adhesive.

Use of the seam patterns described herein in side airbag systems allows for improved air bag performance, particularly when used in conjunction with a linear inflator. Inflation of the airbag takes place in a more uniform manner, reducing the risk of localized overpressurization and seam bursting, and improving occupant protection. Moreover, the seam patterns disclosed herein are relatively simple, and their manufacture is relatively easy ands inexpensive.

It is contemplated that the present invention will find primary application in side impact or head curtain airbag systems; however, it is not limited thereto. It will also be understood that the foregoing description of an embodiment of the present invention is for illustrative purposes only. As such, the various structural and operational features herein disclosed are susceptible to a number of modifications commensurate with the abilities of one of ordinary skill in the art, none of which departs from the scope of the present invention as defined in the appended claims.

The invention claimed is:

1. A curtain airbag comprising:
a first longitudinal panel;
a second longitudinal panel adjacent the first panel; and
a plurality of elliptically-shaped seams connecting the adjacent panels to define a plurality of inflation fluid flow passages between the seams,
each of the seams extending from proximate a top edge of the airbag to proximate a bottom edge of the airbag opposite the top edge when the airbag is in a deployed condition.

2. The airbag of claim 1 wherein a minimum separation distance between adjacent seams of the plurality of seams is substantially equal for each pair of adjacent seams.

3. The airbag of claim 1 wherein the inflation fluid flow passages formed between the seams extend substantially parallel to each other.

4. The airbag of claim 1 wherein a pair of adjacent seams extends along a plane, and wherein a minimum separation distance between the pair of adjacent seams is such that a portion of the airbag projects at least a predetermined distance out of the plane of the seams when the airbag is inflated.

5. The airbag of claim 1 wherein an inflation fluid flow passage formed adjacent at least one of the elliptically-shaped seams extends in a direction substantially parallel to a major axis of the at least one sewn.

6. The airbag of claim 1 wherein major axes of the elliptically-shaped seams are substantially parallel.

7. The airbag of claim 1 wherein each of the elliptically-shaped seams has a shape with a non-zero eccentricity.

8. The airbag of claim 1 wherein the seams are distributed along substantially an entire length of the airbag.

9. The airbag of claim 1 wherein the plurality of seams form a single row of seams extending along a length of the airbag.

10. A vehicle occupant restraint system comprising:
at least one inflatable curtain airbag, the airbag including a first longitudinal panel, a second longitudinal panel adjacent the first panel, and a plurality of elliptically-shaped seams connecting the panels to define a plurality of inflation fluid flow passages between the seams, each of the seams extending from proximate a top edge of the airbag to proximate a bottom edge of the airbag opposite the top edge when the airbag is in a deployed condition; and
an inflator coupled to the airbag so as to enable fluid communication between the inflator and an interior of the airbag upon activation of the inflator.

11. A curtain airbag comprising:
a first longitudinal panel;
a second longitudinal panel adjacent the first panel; and a plurality of elliptically-shaped seams connecting the adjacent panels to define a plurality of inflation fluid flow passages between the seams, each of the seams extending from adjacent a first edge of the airbag to adjacent a second edge of the airbag opposite the first edge.

12. A vehicle occupant restraint system comprising:

at least one inflatable curtain airbag, the airbag including a first longitudinal panel, a second longitudinal panel adjacent the first panel, and a plurality of elliptically-shaped seams connecting the panels to define a plurality of inflation fluid flow passages between the seams, each of the seams extending from adjacent a first edge of the airbag to adjacent a second edge of the airbag opposite the first edge; and an inflator coupled to the airbag so as to enable fluid communication between the inflator and an interior of the airbag upon activation of the inflator.

\* \* \* \* \*

UNITED STATES PATENT AND TRADEMARK OFFICE
CERTIFICATE OF CORRECTION

PATENT NO.        : 8,672,351 B2                                   Page 1 of 1
APPLICATION NO.   : 11/009310
DATED             : March 18, 2014
INVENTOR(S)       : Stevens It is certified that error appears in the above-identified patent and that said Letters Patent is hereby corrected as shown below:

On the Title Page, item (57):

Abstract; Line 8;     Delete "scams" and Insert --seams--.

Abstract; Line 23;    Delete "ands" and Insert --and--.

In the Specification:

Column 2; Line 15;    Delete "and".

Column 3; Line 10;    Delete "Refining" and Insert --Referring--.

Column 3; Line 24;    Delete "sewn" and Insert --seam--.

Column 6; Line 4;     Delete "ands" and Insert --and--.

In the Claims:

Column 6; Claim 5; Line 42;    Delete "sewn" and Insert --seam--.

Signed and Sealed this
Third Day of June, 2014

Michelle K. Lee
*Deputy Director of the United States Patent and Trademark Office*